United States Patent [19]
> Marchioro

[11] 4,183,128
[45] Jan. 15, 1980

[54] CONTROLLED DEFLECTION ROLL

[75] Inventor: Ignazio Marchioro, Schio, Italy

[73] Assignee: Escher Wyss Ltd., Zurich, Switzerland

[21] Appl. No.: 919,042

[22] Filed: Jun. 26, 1978

[30] Foreign Application Priority Data

Aug. 10, 1977 [CH] Switzerland .................. 9792/77

[51] Int. Cl.² .......................................... B21B 13/02
[52] U.S. Cl. ................................................ 29/116 AD
[58] Field of Search ....... 29/113 AD, 116 R, 116 AD

[56] References Cited
U.S. PATENT DOCUMENTS

| | | | |
|---|---|---|---|
| 3,389,450 | 6/1968 | Robertson | 29/116 AD |
| 3,802,044 | 4/1974 | Spillman et al. | 29/116 AD X |
| 4,074,624 | 2/1978 | Biornstad et al. | 29/116 AD X |
| 4,091,517 | 5/1978 | Lehmann et al. | 29/116 AD X |

Primary Examiner—Wayne L. Shedd
Attorney, Agent, or Firm—Werner W. Kleeman

[57] ABSTRACT

A controlled deflection roll having a fixed support and a roll shell rotatable thereabout and supported upon hydraulic pressure elements delimiting a number of pressure compartments at the fixed support. A longitudinal bore extends lengthwise of the fixed support and connection bores lead therefrom to the individual pressure compartments. Pressure regulators coact with the pressure elements for setting the pressure of an hydraulic pressurized fluid medium which is infed to the individual pressure compartments. The housings of the pressure regulators and the actuation elements thereof are insertably arranged in the longitudinal bore of the fixed support and connected with a pressurized fluid medium line for the infeed of the pressurized fluid medium. Each housing has an outlet bore, the mouth of which is surrounded by a sealing region and is connectable with the connection bore of the related pressure compartment. The housing is provided with an hydraulic piston or plunger at a location opposite the sealing region, which piston sealingly closes an hydraulic pressure compartment or chamber and serves to press the sealing region of the outlet bore against the wall of the longitudinal bore of the fixed support. The hydraulic pressure chamber likewise is connected with the pressurized fluid medium line.

9 Claims, 7 Drawing Figures

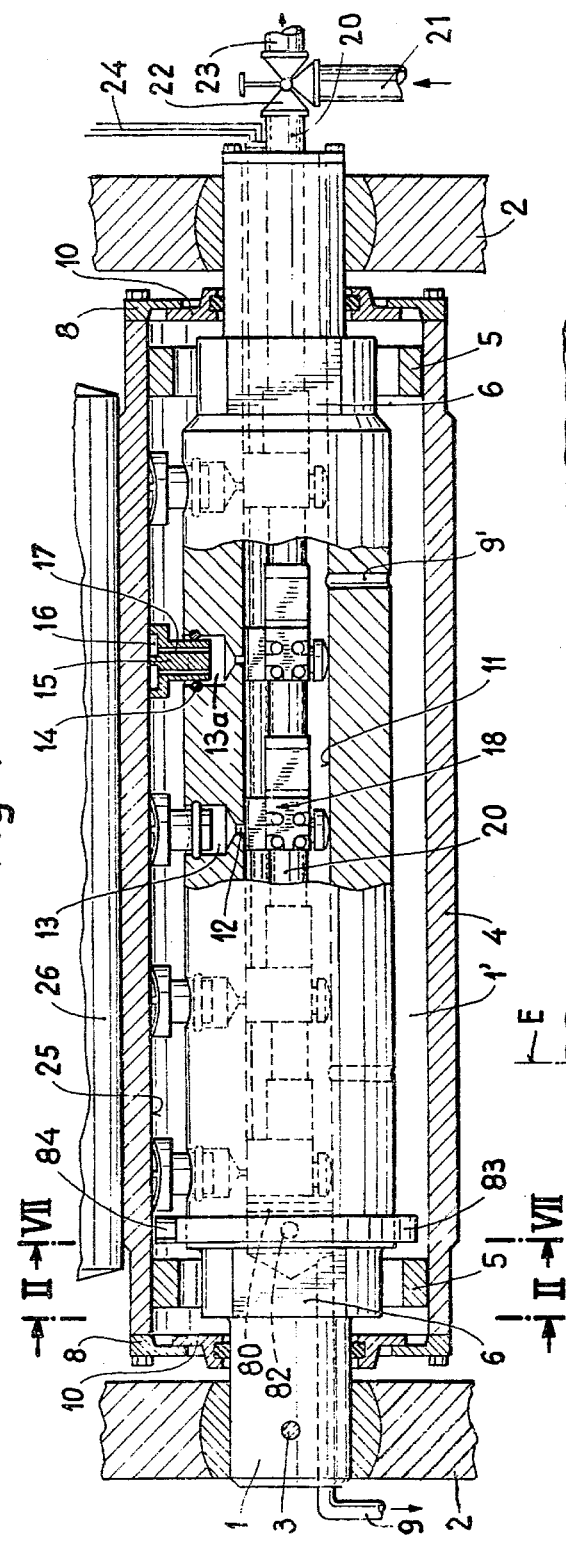
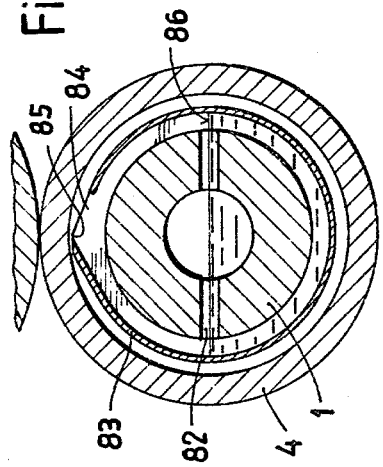
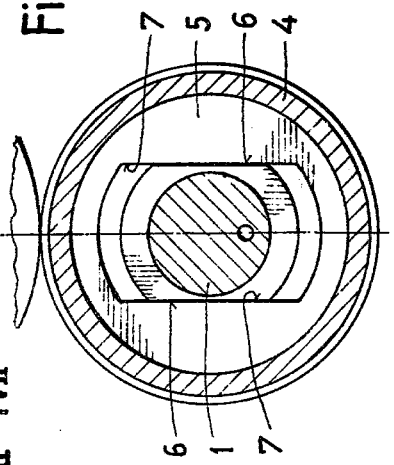

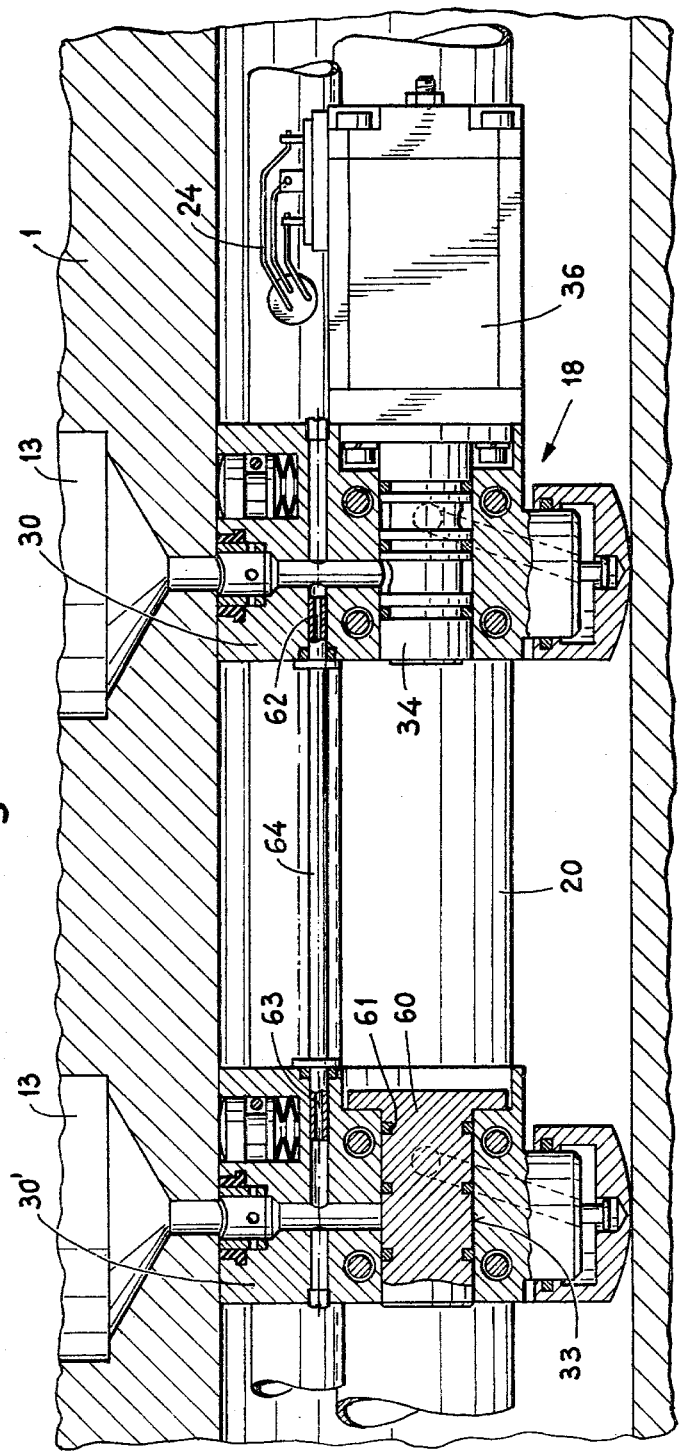

CONTROLLED DEFLECTION ROLL

BACKGROUND OF THE INVENTION

The present invention relates to a new and improved construction of a controlled deflection roll.

Generally speaking, the controlled deflection roll of the present development is of the type comprising a fixed support and a roll shell rotatable about the fixed support. The roll shell is supported upon hydraulic pressure or support elements which limit a number of pressure compartments at the fixed support. Effective within each of the pressure compartments is a hydraulic pressurized fluid medium working at suitable pressures and urging the pressure elements against an inner surface or wall of the roll shell and thereby bracing such at the fixed support. A longitudinal or lengthwise extending bore is formed in the fixed support and extends in the lengthwise direction of such fixed support. Connection bores lead from the longitudinal bore to the individual pressure compartments. Pressure regulators arranged in the fixed support and operatively correlated to the pressure elements serve for setting the pressure of the hydraulic pressurized fluid medium—also referred to sometimes simply as pressure medium—which is infed to the individual pressure compartments.

The present invention constitutes a further improvement upon the controlled deflection rolls which have become known to the art from U.S. Pat. Nos. 3,802,044, 3,885,283 and 3,932,921. U.S. Pat. No. 3,932,921 relates to a controlled deflection roll wherein pressure regulators are arranged in suitable bores of the support and are operatively associated with the individual pressure elements. By means of the pressure regulators, connected with suitable signal lines, for instance of an electrical or pneumatic nature, it is possible to control independently of one another the pressure medium infed to the individual pressure compartment, and thus, the exerted pressure forces of the related pressure elements.

SUMMARY OF THE INVENTION

Hence, with the foregoing in mind it is a primary object of the present invention to provide a new and improved construction of a controlled deflection roll of the previously mentioned type, wherein the pressure regulators of the controlled deflection roll can be easily installed and dismantled as a group or unit.

In keeping with the immediately preceeding object it is a further significant objective of the invention to render possible, in the event of a defect or malfunction, to simply exchange the pressure regulator or its parts with a minimum of downtime.

Yet a further significant object of the present invention aims at the provision of a new and improved construction of controlled deflection roll of the type described having an improved construction of the pressure regulators for the individual pressure compartments, particularly as concerns the ability to readily install and dismantle the same when the need arises.

Yet a further significant object of the present invention relates in the provision of a new and improved construction of controlled deflection roll which is relatively simple in design, economical to manufacture, extremely reliable in operation, not readily subject to breakdown or malfunction, and requires a minimum of maintenance and servicing, and when such is needed can be accomplished with minimized shutdown times of the equipment.

Now in order to implement these and still further objects of the invention, which will become more readily apparent as the description proceeds, the invention contemplates insertably arranging the pressure regulators together with their housings and actuation elements in the longitudinal bore of the fixed support and connecting such at a pressure medium or pressurized fluid medium line for the infeed of the pressure medium. Each housing has an outlet bore whose mouth is surrounded by a sealing region and which can be connected with the connection bore of the related pressure compartment. The housing is provided with a hydraulic piston or plunger at a location opposite the sealing region, this hydraulic piston sealingly closing a hydraulic pressure compartment and serving to press the sealing region of the outlet bore against the wall of the longitudinal bore of the fixed support. The hydraulic pressure compartment likewise is connected with the pressure medium line or infeed conduit.

With such type constructed controlled deflection roll the pressure regulators can be simple inserted into the longitudinal bore and again removed therefrom. The contact or pressing action exerted at the sealing region is accomplished by the hydraulic piston or plunger which is always exposed to pressure as soon as pressure medium is infed through the line. When the pressure medium line is without pressure then the contact force of the sealing region disappears, with the beneficial result that the housing can be moved without any danger of damaging seals in the longitudinal bore. If during operation of the controlled deflection roll the pressure of the pressurized fluid medium or pressure medium suddenly is relieved, for instance by reversing a valve, then the seals of the housing are raised under the action of the pressure medium within the pressure compartments of the pressure elements, so that such pressure medium can flow into the longitudinal bore. Consequently, there is simultaneously effected a rapid relief of the pressure elements, in a manner not heretofore possible or, at the very best, only through the expenditure of complicated and expensive equipment design. As a result, it is possible for instance to rapidly open a roller mill where there is employed the controlled deflection roll.

Preferably the sealing region can be associated with a part or component loaded by a spring and serving for raising the sealing region from the wall of the longitudinal bore. Consequently, there is augmented the raising of the seal in the event of absence of the hydraulic pressure. During displacement movements of the housings of the pressure regulators in the longitudinal bore the seals are thus additionally protected against damage, for instance at the edges of the connection bores.

Furthermore, a housing of a pressure regulator can be associated with at least one additional housing which is structured essentially similar to the housing of such pressure regulator, wherein, however, there is omitted the pressure regulator together with the actuation element. The outlet bore of the additional housing is connected by a connection line or conduit with the outlet bore of the housing having the pressure regulator. In this way it is possible to provide one regulator for a number of pressure elements, which, for instance, beneficially renders possible a saving in the number of regulators which have to be used or a more compact assembly of the housing, and thus, also the pressure or support elements.

Preferably the housings can be interconnected with one another by at least one non-rotatable element having a spacer function for retaining the housings at a predestined spacing from one another corresponding to the spacing of the connection bores. The non-rotatable and spacer-effective element may be in the form of a tube or pipe which simultaneously forms the pressure medium infeed line for the infeed of the pressure medium. In this way there can be accomplished with simple means and without any additional elements a rigid exact connection of the housings with one another. However, it is to be understood that the element also can be, for instance, a rod which consists of one or a number of sections or pieces and extending over the entire length of the controlled deflection roll. In such case the pressure medium infeed line also could be in the form of, for instance, a flexible hose or conduit.

There can be arranged a second tube or pipe parallel to the first tube or pipe serving for the infeed for the pressurized fluid medium or pressure medium. This second tube contains control lines for the individual actuation elements of the pressure regulator units. The tube serving to protect the control lines likewise can be advantageously employed for the rigid interconnection of the housings with one another. However, it should be understood that for the protection of the control lines or conduits there also can be provided, for instance, a hose. The control lines can be electrical wires or pneumatic or hydraulic hoses.

The longitudinal bore of the fixed support can be connected by means of at least one transverse bore with the intermediate space between the fixed support and the roll shell. Further, there is provided at least one scoop device which serves for removal of the hydraulic medium out of the intermediate space between the roll shell and the fixed support into an outflow or drain line. The longitudinal bore can be sealed by means of a closure part or element at the region of one of the ends of the roll shell externally of the outermost pressure regulator. The section of the longitudinal bore disposed externally of the closure element is connected with the scoop device.

With such constructed controlled deflection roll the scoop device, during operation, insures that the intermediate space between the roll shell and the fixed support only is filled with a small quantity of hydraulic medium, which, under the influence of the centrifugal forces, forms a ring along the inner surface of the roll shell. The closure element prevents the return flow of the scooped-out or removed hydraulic medium into the inner part of the bore and back through the transverse bores. Hence, during operation an appreciable part of the intermediate space between the roll shell and the fixed support is maintained free of hydraulic medium.

Now if for the purpose of rapidly opening the roller or rolling mill the pressure of the pressure medium is suddenly reduced, then the pressure medium located in the hydraulic pressure elements can flow out into the intermediate space through the transverse bores, accelerating the pressure drop at the pressure elements and augmenting the opening action of the roller mill.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a longitudinal sectional view of a controlled deflection roll constructed according to the teachings of the present invention;

FIG. 2 is a cross-sectional view of the controlled deflection roll shown in FIG. 1, taken substantially along the line II—II thereof;

FIG. 5 is a fragmentary sectional view, corresponding to the showing of FIG. 3, of two mutually shown inter-connected housings, one of which housings is provided with a pressure regulator and the other of which is without a pressure regulator;

FIG. 7 is a cross-sectional view of the arrangement of FIG. 1, taken substantially along the line VII—VII thereof.

DETAILED DESCRIPTION OF THE PREFERRED EMBODIMENTS

Figure 3:
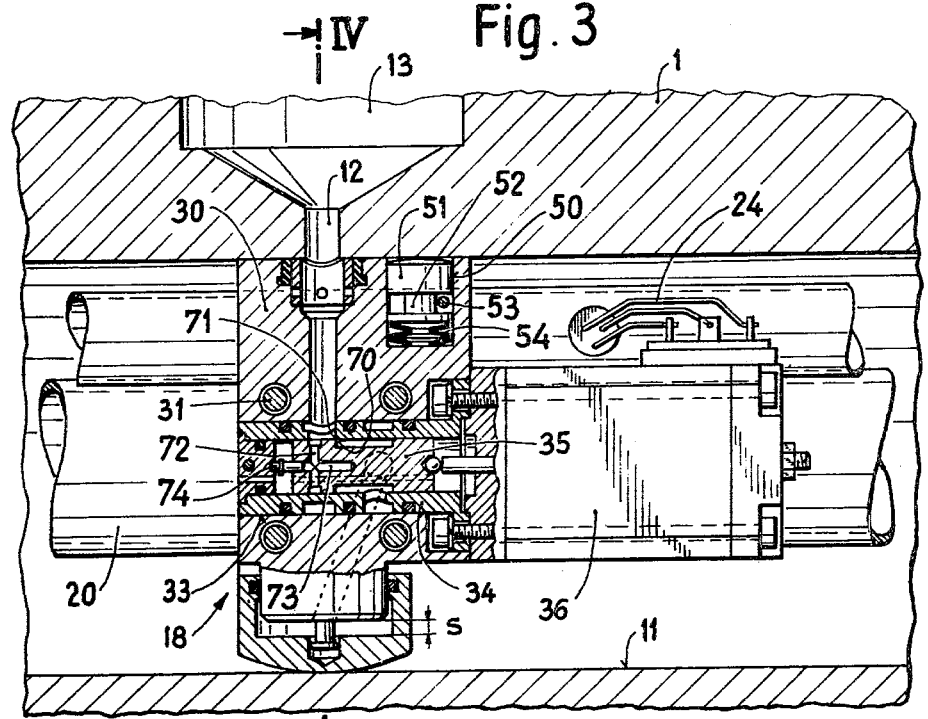
FIG. 3 illustrates a detail on an enlarged scale and in sectional view of a housing having a pressure regulator.

Describing now the drawings, the controlled deflection roll illustrated by way of example in FIG. 1 will be seen to comprise a fixed support 1 which is supported in a frame 2, for instance a roller press or mill and secured against rotation by the pins 3 or equivalent structure. A flexible roll shell 4 is arranged about the fixed support 1. As best seen by referring to FIG. 2, the roll shell 4 is rotatably mounted at guide disks or plates 5 and displaceable together therewith, in a plane E, relative to the fixed support 1 in the direction of guide surfaces 6 in the disks 5 and 7 at the fixed support 1. The ends of the roll shell 4 are closed by the schematically illustrated closure elements here shown in the form of closure disks or plates 8 and 10 which prevent any outflow of hydraulic fluid medium from the intermediate space 1' between the fixed support 1 and the roll shell 4 towards the outside.

As best seen by referring to FIG. 1, the fixed support 1 is provided with an axial longitudinal or lengthwise extending bore 11 from which lead connection bores 12 to the cylinder bores 13. Sealingly guided in the cylinder bores 13 are hydrostatic support or pressure elements here shown in the form of support or pressure pistons 15 in the seals or sealing means 14. The pistons 15 are equipped with hydrostatic bearing or support pockets 16 which are connected by bores 17 with the cylinder compartment or chamber 13a of the related cylinder bore 13.

As to the mode of operation of the hydrostatic pressure elements or support pistons 15 attention is directed to the aforementioned U.S. Pat. No. 3,802,044, the disclosure of which is incorporated herein by reference. Equally, reference may be had to the likewise aforementioned U.S. Pat. No. 3,885,283, describing in detail the guiding of the roll shell relative to the fixed support with the aid of the guide disks 5, and the disclosure of which is likewise incorporated herein by reference.

As also further seen by referring to FIG. 1, pressure regulators 18 are arranged in the axial longitudinal bore 11. These pressure regulators 18 are interconnected with one another by means of a tube or pipe 20 or equivalent structure. The tube 20 is connectable with an infeed line or conduit 21 for a hydraulic pressurized fluid medium or pressure medium, and specifically, according to the illustration of the embodiment of FIG. 1, by means of a three-way valve 22 which simultaneously renders possible a rapid relief of the pressure through a pipe conduit 23. An outflow or drain line 9 leads outwardly from the bore 11. Additionally, the fixed support 1 is provided with transverse bores 9' which connect the longitudinal bore 11 with the intermediate space or compartment 1' between the fixed support 1 and the roll shell 4.

As to the mode of operation of the controlled deflection roll illustrated in FIG. 1 it is sufficient to remark that the hydraulic pressure medium which is infed through the tube or pipe 20 is brought to a desired pressure at the pressure regulators 18, such pressure being governed by control signal lines 24 leading through a tube or pipe 20' to the individual pressure regulators 18. The pressure of the pressure medium which is determined in this manner arrives at the cylinder bores 13 and urges by means of the resultant forces the pistons 15 against the inner surface or wall 25 of the roll shell 4. In this way, the roll shell 4 is pressed with a large contact or pressing force of desired magnitude and desired course or action in its lengthwise direction against a counter roll 26 of the roller mill or device.

Figure 4:
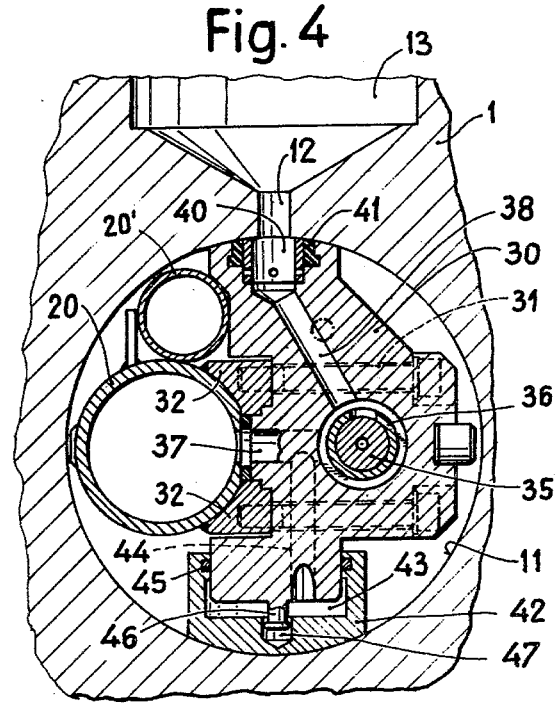
FIG. 4 is a cross-sectional view of the showing of FIG. 3, taken substantially along the line IV—IV thereof.

FIGS. 3 and 4 show on an enlarged scale sectional views of a housing having a pressure regulator and the region of the roll support surrounding such housing.

Specifically, according to the illustration of FIGS. 3 and 4 each such pressure regulator comprises a housing 30 which is attached with the aid of screws 31 or any other suitable fixing means at the tube 20. These screws 31 are threaded into the parts or elements 32 which, for instance, are welded or soldered at the tube 20. A continuous bore 33 is formed in the housing 30. Arranged within such continuous bore 33 is a slide bushing 34 and a slide piston 35 of a regulating slide valve which can be actuated by an electromagnet 36. As best seen by referring to FIG. 4, the slide piston or slide valve piston 35 together with the slide bushing or sleeve 34 controls the flow of the hydraulic pressure medium from the tube 20 by means of a high pressure bore 37 into an outlet bore 38 which flow communicates with the connection bore 12 of the support 1.

The mouth 40 of the outlet bore 38 is surrounded by a soft seal or sealing means 41 which seals the connection location of the bores 38 and 12. In order to press the seal 41 against the not particularly referenced inner wall of the longitudinal bore 11 there is provided a hydraulic piston or plunger 42 which together with the housing 30 surrounds a pressure compartment or chamber 43. This pressure compartment or chamber 43 is connected by means of a connection bore 44 or equivalent structure with the high pressure bore 37.

The pressure compartment 43 is sealed towards the outside by means of a seal 45 located in the piston or plunger 42. In order to parallelly guide the piston or plunger 42 at the housing 30 the latter is provided with a plug or pin 46 which is guided with play in a blindhole bore 47 of the piston or plunger 42, hereinafter generally simply referred to as the piston 42.

At the region of the mouth 40 of the outlet bore 38 and the seal 41 there is located a bore 50 in which there is guided a pin or plug 51 which is secured by a cutout or recess 52 and a pin 53 against sliding out of the bore 50. The pin 51 is biased by means of a spring 54 which presses such out of the housing towards the outside against the inner wall of the bore 11. The force of the spring 54 is dimensioned such that in the case where the pressure compartment 43 is without pressure and the piston 42 is relieved, the seal 41 is raised by the pin 51 from the wall of the bore 11. The thus obtained play is of the same size as the stroke S of the piston 42, as best seen by referring to FIG. 4. During any shifting movement of the tube 20 with the housings 30 in the bore 11 there is thus precluded damage to the seals 41 by sharp edges of the connection channels 12. On the other hand, the spring force of the spring 54 is again chosen such that it is overcome by a pressure prevailing in the pressure compartment or chamber 43, i.e., at the region of the controlled deflection roll, so that the piston 42 can press the seal of sealing means 41 against the wall of the bore 11.

Continuing, now in FIG. 5 there is shown an exemplary embodiment of the invention wherein in each instance a pressure regulator 18 of the described construction and having a slide bushing or sleeve 34 and a slide piston 35 which can be actuated by an electromagnetic 36 is operatively associated with a housing 30' devoid of any such regulator. The housing 30' is otherwise structured the same as the housing 30 and provided with the same components or parts, such as the piston 42, seal or seal means 41 and plug or pin 51. In the bore 33 of the housing 30' there is, however, a closure pin 60 having the seals 61 which closes the bore 33, interrupts the connection of the bores 37 and 38 (FIG. 4), however leaves open the connection of the bores 37 and 44.

Instead, the housing 30 of the pressure regulator 18 and the housing 30' are provided with lateral bores 62 and 63 in which there is sealingly secured a connection pipe or tube 64.

With this embodiment the tube 64 forms a connection of the outlet bore 38 of the housing 30 of the pressure regulator 18 with the outlet bore 38 of the housing 30' which is not provided with any pressure regulator. The pressure regulator 18 thus controls the pressure of two neighboring cylinder bores 13. It should be understood that in this manner a pressure regulator 18 also can influence more than two neighboring pressure elements.

Figure 6:
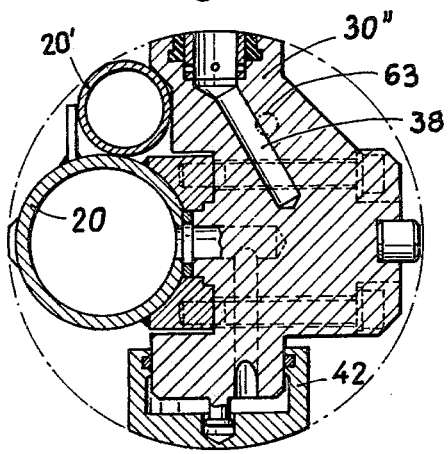
FIG. 6 is a sectional view, corresponding to the showing of FIG. 4, of a further embodiment of housing devoid of a pressure regulator.

Now in FIG. 6 there is shown in sectional view, corresponding to the showing of FIG. 4, a possible embodiment of a housing 30" devoid of any pressure regulator and wherein the bore 33 has been simply omitted. In this case the bore 38 is a blindhole bore which is connected with the bore 63, by means of which it receives the pressure medium at the controlled or regulated pressure.

The actual pressure regulator with the slide bushing or sleeve 34, the slide piston 35 and the electromagnets 36 are commercially available units which equally can be replaced by other devices suitable for the purposes of the present invention. Therefore, no further discussion or explanation thereof appears to be necessary as concerns such parts. It is sufficient to remark that the slide valve piston 35 has a control edge 70 which coacts with the edge of an opening 71 of the slide bushing or sleeve 34. The regulated pressure effective in the opening 71, and which also is effective in the bore 38, arrives by means of the bores 72 in a bore 73 where there is sealingly guided a pin 74. The regulated pressure emanating from the bore 38 acts in this manner in the bore 73 upon the pin 74 and is effective as a reaction force upon the slide piston or slide valve piston 35. It should be understood that in this manner there is formed an hydraulic force which is effective towards the right upon the slide piston 35 and which counteracts the force of the electromagnets 36. Hence, there is always formed an equilibrium condition between the force of the electromagnets 36 applied by the reference value signal and the hydraulic force formed by the hydraulic pressure following the regulating slide valve unit.

As already mentioned, the controlled deflection roll, during operation, has infed thereto hydraulic pressure medium, as a general rule pressurized oil, through the line 21 and the tube 20. By means of the pressure regulators 18, which reduce the pressure of the pressure medium to a desired value, the medium arrives in the cylinder compartments or chambers 13 and presses the pistons 15 with the appropriate compressive or pressure force against the inner surface of the roll shell 4. The pressure force of the individual pistons 15, and, with the embodiment of FIG. 5, individual groups of pistons, which are connected to a common pressure regulator 18, is adjustable from the outside by means of the signal lines 24. Thus, as mentioned, with the illustrated exemplary embodiments there prevails a hydrostatic lubrication between the bearing or support surfaces of the piston 15 and the inner surface of the roll shell 4. If the bearing pockets 16 with the connection channels 17 are omitted there is also possible a hydrodynamic lubrication of the running or moving surfaces.

During operation the medium emanating from the bearing or support pockets 16 arrives at the annular or ring-shaped intermediate compartment 1' between the fixed support 1 and the roll shell 4. From this intermediate compartment 1' such medium passes through the bore 9' into the longitudinal bore 11 and into the outflow or drain line 9.

Now by switching the three-way valve 22 the tube or pipe 20 is relieved of pressure, then also the excess pressure at the pressure compartments 43 of the piston 42 disappears. The springs 54 outwardly displace the pins 51 and lift the seals 41 from the inner wall of the longitudinal bore 11. The medium located in the cylindrical bores 13 rapidly flows into the bore 11 and out of such into the intermediate space 1' between the fixed support 1 and the roll shell 4. In this way there is possible a rapid liftoff of the roll shell 4 from the counter-roll or counter-support roll 26, which, for instance, is advantageous for the purpose of rapidly opening the roller mill within which there is used the inventive controlled deflection roll.

This rapid opening action can be still further assisted according to the showing of the embodiment of FIG. 1 in that the longitudinal bore 11 is closed externally of the outermost pressure regulator 18 by means of a disk-shaped closure element 80. This closure element 80 completely closes off the left end of the longitudinal bore 11. The bore 11 need not be sealingly closed by the closure part or element 80; it is merely sufficient if the flow of the hydraulic medium is appreciably hindered by the element.

Externally of the closure element 80, i.e., to the left of this element, there are located transverse bores 82 which flow communicate the intermediate space or compartment 1' with the longitudinal bore 11. Additionally, a scoop ring 83 or equivalent structure is located at the transverse bores 82. The shape of such scoop ring 83 will be apparent from the sectional view of FIG. 7 which is taken essentially along the section line VII—VII of FIG. 1.

The scoop or pick-up ring 83 is attached at the fixed support 1 and more or less surrounds such in a sealing fashion. At the upper region of its periphery the scoop ring 83 is equipped with an inlet opening 84 whose outer periphery is limited by a scoop edge 85. Scoop rings of this type are known to the art, for instance from German patent publication 25 50 366, and in this regard attention may be directed specifically thereto and the disclosure of which is incorporated herein by reference.

During operation the roll shell 4 rotates about the fixed support 1, and the hydraulic medium located in the intermediate space or compartment 1', for instance oil, rotates together with the roll shell 4 and forms therein a liquid ring along the inner wall 25. This liquid ring moves past the scoop edge 85, and this aforementioned edge feeds the part of the liquid protruding over such edge into the interior space of such scoop ring 83. The hydraulic liquid forms within the scoop ring 83 a liquid level 86 and flows through the transverse bores 82 into the outflow or drain line 9. A return flow of the liquid through the transverse bores 82 into the part of the longitudinal bore 11 located at the right of the scoop ring 83 is prevented by the closure element or part 80. In this way the intermediate space 1' is held essentially free of hydraulic medium, with the exception of a ring-shaped layer along the inner surface 25 of the roll shell 4, the thickness of which is determined by the spacing of the scoop edges 85 from the inner surface 25.

Now if suddenly the line or conduit 20 is relieved of pressure by appropriately switching the valve 23, then the mouths 40 of the connection bores 12 are lifted-off, so that the oil can flow out of the cylinder chambers or compartments into the longitudinal bore 11. The liquid flows out of the longitudinal bore 11 through the transverse bores 9' into the intermediate space 1' which is held free by virtue of the action of the scoop rings 83 and is in readiness for the reception of the hydraulic medium.

With the illustrated exemplary embodiment the pressure regulators 18 together with their housings 30 can be retracted from and again inserted into the longitudinal bore 11 with the aid of the tube or pipe 20 in a most rapid fashion. Under circumstances it would be possible for mechanically interconnecting the housings 30 and 30', 30" with one another, to also use a rod which, for instance, can be formed of a number of parts or sections. In such case the tube or pipe 20 with the tube 20' can be replaced by a hose or the like.

It should be understood that the cross-section of the piston or plunger 42 which is effective for the purpose of forming the contact force must be sufficiently large in order to be able to overcome the hydraulic force which is effective within the seal 41 as well as the force of the spring 54, and additionally, must be capable of also exerting a contact or pressure force upon the seal 41.

According to the showing of FIGS. 3 to 5 the sealing region surrounding the mouth 40 of the outlet bore 38 is provided with a soft seal 41 or equivalent structure. It should be understood that the sealing region also can be differently designed. Thus, for instance, the mouth 40 can be surrounded by a metallic ring-shaped or annular projection or by a number of concentric projections. The sealing region which surrounds the mouth 40 can be, however, also formed by a smooth, possibly ground surface. Under circumstances this sealing region also can be constructed to be crowned or conical. In such instance it also can be insertable into the connection bore 12.

As already mentioned the electromagnets 36 can be replaced by other suitable elements which, for instance, can be activated by pneumatic or hydraulic pressure. In this case the electrical control lines 24 are replaced by appropriate pipe conduits or lines.

In accordance with the already mentioned U.S. Pat. No. 3,802,044, especially FIG. 4 thereof, the hydraulic pressure elements also can have the shape of punches or pistons which are guided on projections at the fixed support 1. Also according to the showing of FIG. 6 these elements can be of ledge-shaped construction.

Furthermore, it is possible to also dispense with the hydraulic bearing or support pockets 16 having the bores 17, so that between the pressure or support pistons 15 and the roll shell 4 there only exists a hydrodynamic support or bearing, for instance as taught in U.S. Pat. No. 3,119,324.

Finally, in accordance with the teachings of U.S. Pat. No. 3,802,044 the roll shell 4 can be mounted at its ends in roller bearings at the fixed support 1. In this case there are dispensed with the guide disks 5 and the guide surfaces 6 and 7.

While there are shown and described present preferred embodiments of the invention, it is to be distinctly understood that the invention is not limited thereto, but may be otherwise variously embodied and practiced within the scope of the following claims.

Accordingly, what I claim is:

1. A controlled deflection roll comprising, in combination:
   a fixed support;
   a roll shell;
   means for mounting said roll shell to be rotatable about said fixed support;
   hydraulic pressure elements at which there is supported said rotatable roll shell;
   said fixed support being provided with a number of pressure compartments;
   each pressure compartment being bounded by a related one of the pressure elements;
   means for infeeding a hydraulic pressure medium to said pressure compartments for pressing the pressure elements against an inner surface of the roll shell and supporting said roll shell at said fixed support;
   said means for infeeding the pressure medium comprising a longitudinal bore provided at the fixed support and extending in the lengthwise direction of said fixed support;
   connection bores leading from said longitudinal bore to the individual pressure compartments;
   a plurality of pressure regulators for setting the pressure of the hydraulic pressure medium which is infed to the individual pressure compartments;
   said pressure regulators being arranged in said fixed support and operatively associated with said pressure elements;
   each of said pressure regulators having a housing and actuation means insertably arranged in said longitudinal bore of said fixed support;
   a pressure medium infeed line for the infeed of the pressure medium with which there are connected each of said pressure regulators;
   each of said housings having an outlet bore including a mouth portion;
   means defining a sealing region surrounding the mouth portion of the related outlet bore;
   each mouth portion being connected with the outlet bore of the related pressure compartment;
   an hydraulic piston provided for said housing at a location opposite said sealing region;
   said hydraulic piston sealingly closing an hydraulic pressure chamber and serving for pressing the sealing region of the outlet bore against a wall of said longitudinal bore of said fixed support; and
   said hydraulic pressure chamber being connected with said pressure medium infeed line.

2. The controlled deflection roll as defined in claim 1, further including:
   a spring-loaded element operatively associated with said sealing region;
   spring means for loading said element;
   said spring-loaded element serving for lifting-off the sealing region from the wall of the longitudinal bore.

3. The controlled deflection roll as defined in claim 1, further including:
   at least one additional housing operatively associated with said housing provided with a related one of said pressure regulators;
   said additional housing being essentially of the same construction as said housing of said related pressure regulator;
   said additional housing being devoid of a pressure regulator and actuation means;
   said additional housing having an outlet bore;
   a connection line for connecting said outlet bore of said additional housing with said outlet bore of said housing provided with said related pressure regulator.

4. The controlled deflection roll as defined in claim 3, further including:
   means for interconnecting and retaining in mutually spaced relationship said housings with respect to one another;
   the spacing of said housings corresponding to the spacing of said connection bores.

5. The controlled deflection roll as defined in claim 4, wherein:
   said interconnecting means comprises at least one non-rotatable element having a spacer action between the housings.

6. The controlled deflection roll as defined in claim 5, wherein:
   said non-rotatable element comprises a tube simultaneously forming said pressure medium infeed line for the infeed of said pressure medium.

7. The controlled deflection roll as defined in claim 6, further including:
   an additional tube arranged essentially parallel to said first-mentioned tube for the infeed of the pressure medium;
   said additional tube being equipped with control lines for the individual actuation means of the pressure regulators.

8. The controlled deflection roll as defined in claim 1, wherein:
   said fixed support and said roll shell coact with one another so as to form an intermediate compartment;
   at least one transverse bore for connecting said longitudinal bore of said fixed support with said intermediate compartment;

outflow line means for the hydraulic pressure medium;

at least one scoop means for removal of the hydraulic pressure medium from the intermediate compartment between the roll shell and said fixed support and for transfer to said outflow line means.

9. The controlled deflection roll as defined in claim 8, wherein:

said roll shell has opposed ends;

a closure element for sealing the longitudinal bore at the region of one of the ends of said roll shell externally of an outermost one of said pressure regulators;

said longitudinal bore having a portion located externally of said closure element;

said portion of said longitudinal bore being connected with said scoop device.

* * * * *